United States Patent [19]

Schmalfuss et al.

[11] Patent Number: 4,749,870
[45] Date of Patent: Jun. 7, 1988

[54] METHOD AND APPARATUS FOR MEASURING DATA FOR CALCULATING THE DIAMETER OF WHEELS, ESPECIALLY RAILROAD WHEEL SETS

[75] Inventors: Harald Schmalfuss, Rodgau; Friedel Sinsel, Frankfurt; Reinhold Bolz, Floersheim; Bernhard Schneider, Hofheim; Werner Heinze, Frankfurt, all of Fed. Rep. of Germany

[73] Assignee: Wilhelm Hegenscheidt Gesellschaft mbH, Erkelenz, Fed. Rep. of Germany

[21] Appl. No.: 876,266

[22] Filed: Jun. 19, 1986

[30] Foreign Application Priority Data

Jun. 26, 1985 [DE] Fed. Rep. of Germany ....... 3522810
Mar. 24, 1986 [EP] European Pat. Off. ........ 86104026.9

[51] Int. Cl.⁴ .............................................. G01V 9/04
[52] U.S. Cl. .................................... 250/560; 356/385
[58] Field of Search ................ 250/560, 224; 356/384, 356/385, 386, 387; 364/561, 562, 563

[56] References Cited

U.S. PATENT DOCUMENTS

| | | | |
|---|---|---|---|
| 3,001,438 | 9/1961 | Wharten | 356/385 |
| 3,897,156 | 7/1975 | Chasson | 356/385 |
| 4,375,921 | 3/1983 | Morander | 250/560 |

Primary Examiner—David C. Nelms
Assistant Examiner—Jessica L. Ruoff
Attorney, Agent, or Firm—W. G. Fasse; D. H. Kane, Jr.

[57] ABSTRACT

The diameter of a wheel or wheels, such as railroad wheels, is measured while the wheel rolls through a measuring station or while a measuring station is moved past a wheel. Electromagnetic beams, such as light or laser beams, provide respective barriers or sensors. The spacing between the beams is fixed and the time needed to traverse the spacing is measured. The spacing has a definite relationship to the wheel diameter. A computer calculates the diameter based on the measured time and on the given wheel diameter related spacing. Even where only a portion of a wheel is available for sensing or scanning the present method may be used.

19 Claims, 5 Drawing Sheets

METHOD AND APPARATUS FOR MEASURING DATA FOR CALCULATING THE DIAMETER OF WHEELS, ESPECIALLY RAILROAD WHEEL SETS

FIELD OF THE INVENTION

The invention relates to a method and to an apparatus for measuring the diameter of wheels, especially railroad wheel sets. The diameter of such wheels must be monitored in order to ascertain whether maintenance work is necessary.

DESCRIPTION OF THE PRIOR ART

Many devices and methods for measuring the wheel diameter of wheel sets are known in the art. All of these methods and devices require the removal of the wheel set from the vehicle for measuring the wheel diameter because the wheel set must be inserted into a measuring station. As long as the wheel set needs to be removed from the vehicle anyway for performing maintenance work, it is no problem to also measure the wheel diameter while the wheel is removed from the vehicle. However, the removal of the wheel set from the vehicle for routine diameter measurements is not desirable, especially since the measurement may indicate that maintenance work is not yet needed.

In many instances it is necessary to determine the wheel diameter at times other than the above mentioned time when maintenance work is being performed. For example, precautionary check-ups of the wheel sets should be performed more frequently than the maintenance work to ascertain whether all the wheels of a wheel set or even all the wheels of a bogie have the same diameter. Further, it is desirable to be able to measure the diameter of wheels still attached to a vehicle when a reprofiling or truing operation is to be performed on a so-called underfloor apparatus because such an apparatus can perform the maintenance work without the removal of the wheels from the vehicle. In the just mentioned instances it would be desirable to determine the wheel diameter at least for a vehicle or train traveling at a relatively low speed.

OBJECTS OF THE INVENTION

In view of the foregoing it is the aim of the invention to achieve the following objects singly or in combination:

to provide a method for measuring the diameter of rolling wheels moving past a measuring station;

to provide an apparatus in the form of a measuring station for ascertaining the diameter of wheels rolling through the measuring station regardless of whether the wheels are mounted to a vehicle or not, whereby the measuring station may be movable;

to ascertain the wheel base of moving vehicles on the basis of wheel diameter measurements;

to measure the wheel diameter even if the respective vehicle is being accelerated or decelerated;

to perform repetitive measurements for an improved accuracy by forming a mean value; and to calculate the wheel diameter by rolling the wheel along a defined length of track, measuring the time needed by the wheel to pass through the defined length of track, and calculating the wheel diameter from the measured time and the known or defined length of track.

SUMMARY OF THE INVENTION

The above objectives have been achieved by the method according to the invention in that a wheel or wheel set is moved relative to a reference plane or along a reference plane and in that the displacement or distance time function of the motion is determined with reference to the speed or acceleration of the wheel or wheel set. More specifically, the time needed by the wheel to pass through a diameter dependent distance along the reference plane is measured in the plane of the diameter to be measured and the measured result is used together with the determined or given displacement time function for calculating the wheel diameter in the mentioned plane. Thus, first the speed of the wheel, which may be attached to a vehicle, is measured in a determined measuring range and thereafter the time needed for passing through the diameter dependent distance is ascertained with the measured speed. The size of the diameter dependent distance is initially unknown and is determined from the known speed of the wheel and from the time needed for the wheel to pass through this wheel diameter dependent distance. The so ascertained wheel diameter dependent distance is then used for calculating the wheel diameter. As mentioned, the so determined wheel diameter may be used for maintenance purposes as well as for other purposes, for example, to ascertain in connection with the vehicle speed the wheel base of a vehicle and/or bogie. Information providing the wheel base may frequently be used to make conclusions regarding the manufacturer of the vehicle and regarding the vehicle type.

According to a modification of the present method, several speed measurements are made sequentially for ascertaining an acceleration value or component. By measuring an acceleration component it is possible to determine the wheel diameter even when a wheel or wheel set is being accelerated or decelerated. The measurement of an acceleration component is rather simple, as will be described in more detail below.

By repetitively measuring the time needed by the wheel for passing through a wheel diameter dependent distance and by using a given distance-time function, it is possible to provide certain and accurate measurements by the formation of a mean value.

Preferably, the wheel or wheel set to be measured is rolled on a length of track forming a reference plane and measuring the rolling speed (v) and/or the wheel acceleration, whereby the time needed for passing through a diameter dependent length of track is measured along with the rolling speed or along with the mentioned acceleration in the plane of the diameter to be measured. The so obtained values are then used for calculating the wheel diameter in the mentioned plane extending in parallel to the reference plane.

The apparatus according to the invention for performing the method of the invention comprises the following components. A wheel supporting means, such as a rail or track section, permits a wheel or wheel set to roll past a measuring station or vice versa. The measuring station comprises means for radiating at least two electromagnetic beams or ray bundles toward a wheel passing through the measuring station. Preferably, the wave length of the electromagnetic beams or ray bundles is in the range of about 200 to 2000 nm (nanometers). These at least two electromagnetic beams extend at least approximately in a measuring plane through which the wheel passes, the diameter of which is to be measured. Stated differently, the measuring plane coincides at least approximately with a wheel plane extending in the wheel perpendicularly to the rotational axis of the wheel. The two electromagnetic beams may extend in parallel to each other and have a given, fixed spacing from each other. Receiver means are so arranged that beams reflected by a wheel passing through the measuring plane are received by the receiver means for evaluation by signal processing means to produce signal information representing the wheel diameter. Preferably, there are more than one receiver means, namely, one receiver for each reflected beam. Further, when these beams extend in parallel to each other they are movable in the measuring plane, preferably, in a direction perpendicularly to the beam direction. The signal processing means are connected to the receiver means for the signal evaluation. The signal processing means include time measuring means for producing measured signals representing the wheel diameter which is determined on the basis of the time needed by the wheel for passing through a measured distance in the measuring plane.

Preferably, the means for radiating at least two electromagnetic beams or ray bundles comprise two laser transmitters. The rail section forming the wheel supporting means defines the measuring plane which is simultaneously a plane through which the wheel runs and in which the wheel diameter is to be ascertained.

The lasers are switched on prior to a wheel passing through the measuring plane. The lasers may be switched on manually by an operator or they may be switched on by a rail switch activated by a wheel moving toward the measuring station. When a wheel entering into the measuring station contacts, so to speak, the first laser beam tangentially, the point of contact between the wheel circumference and the laser beam radiates or rather reflects a diffuse laser light which is received by a laser optical receiver producing an output signal which in turn is supplied to the signal processing means for setting a first time marker in a time measuring device, such as a counter.

As the wheel continues to roll through the measuring station, its leading point on the wheel circumference will again tangentially contact the next laser beam, whereby again a diffuse laser light is reflected and received in the respective optical laser light receiver for setting a second time marker. The horizontal spacing between the two laser beams constitutes the above mentioned measured or fixed distance which is wheel diameter dependent. This fixed distance is known by the construction of the measuring station. This fixed distance is determined by an experience value range representing wheel diameters expected to be measured in the measuring station. This fixed distance may be, for example, smaller or larger than the expected average wheel diameter. The time measured between the two time markers and the given or measured distance are then used in the signal processing means, or rather, in a computer forming part of the signal processing means, for calculating the speed with which the wheel passes through the measuring station, or a measuring station past a wheel.

The measured or fixed given distance may be smaller or larger than the wheel diameter to be measured, due to the following feature of the invention. For example, when the given basic distance is smaller than a wheel diameter being measured, a further time duration is started by the above mentioned second time marker. This second time duration is stopped when the point on the wheel circumference facing backwardly, that is, opposite to the wheel travel direction, passes through the first laser beam, thereby producing a third time marker with the aid of the laser light reflected by the rearwardly facing surface point on the wheel circumference. Thus, there are three time markers, whereby the second time marker stops the first time duration and begins the second time duration. This second time duration depends directly on the wheel diameter, for example, when the wheel passes with a uniform speed through the measuring station. Thus, the just described apparatus and its function permit an especially easy calculation of the wheel diameter because that wheel diameter corresponds to the measured distance or given spacing between the two laser beams plus the product resulting from the multiplication of the second time spacing with the speed of the wheel.

The receiver means or the receiver optical members must be so constructed that they are capable of receiving the reflected electromagnetic radiation resulting from the wheel circumferential surface passing through the electromagnetic radiation. Thus, the receivers are tuned to the wave length of the electromagnetic radiation. In the following text the term "receiver" may include receiver optical means or vice versa.

For performing repeated measurements to produce a mean value, several laser transmitters for emitting laser beams are spaced from one another along a track section, whereby the spacing or track length between neighboring laser transmitters or beams is known. A high measuring accuracy or certainty is achieved by forming such mean values. Additionally, it thus becomes possible to measure a wheel acceleration or deceleration. It is advantageous to make the spacing between neighboring laser transmitters smaller than the above mentioned measured distance or basic distance between two laser beams for setting the first and second time marker. Thus, the acceleration components can be ascertained with an improved certainty.

It is advantageous to provide known definite spacings between the radiated beams and between the beams and the measuring plane. Further, the electromagnetic radiation beam transmitters and their respective receivers or receiver optical means are located in a plane extending perpendicularly to the measuring plane which is also the plane in which the wheel to be measured is running, and in parallel to the longitudinal axis of a wheel set, whereby the transmitters and receivers are divided into two groups. The radiating beams are so tilted that each beam of one group diverges with regard to the beam direction of the other group and vice versa. With this arrangement it becomes possible to apply the same measuring principle and a device having basically the same construction for measuring the diameter even where less than half a wheel becomes available for the measurement. Thus, the measurement can still be made even if, for example due to brake shoes, only about 120° of the wheel circumference are accessible for the measurement. However, in this instance the required calculations are somewhat more involved because the diameter dependent portion of the wheel now is part of a chord rather than of the diameter.

The calculation can be simplified when the transmitters and receivers are arranged symmetrically, or rather mirror-symmetrical relative to a plane which forms an angle bisector of the respective diverging transmitted and reflected beams. Due to this symmetrical arrangement, the same numerical values appear on both sides of the plane, whereby, as mentioned, the calculation is simplified. Another advantage of this symmetrical arrangement is seen in that the alignment of the measuring station relative to a track section is simplified. However, the calculation and alignment may also be simplified by arranging the groups in such a way that the respective beams extend in parallel to one another.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
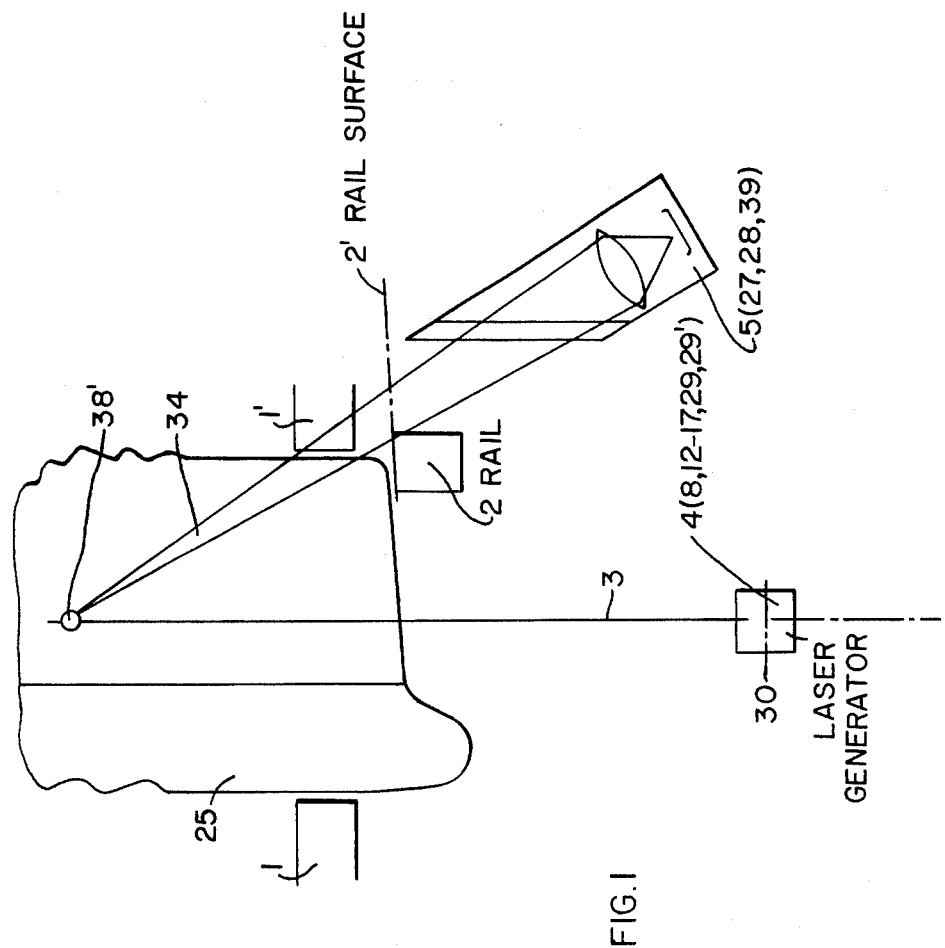
FIG. 1 is a schematic view, partially broken away, in the direction of the arrow A in FIG. 5, or in the direction of the arrow B in FIG. 4.
Figure 5:
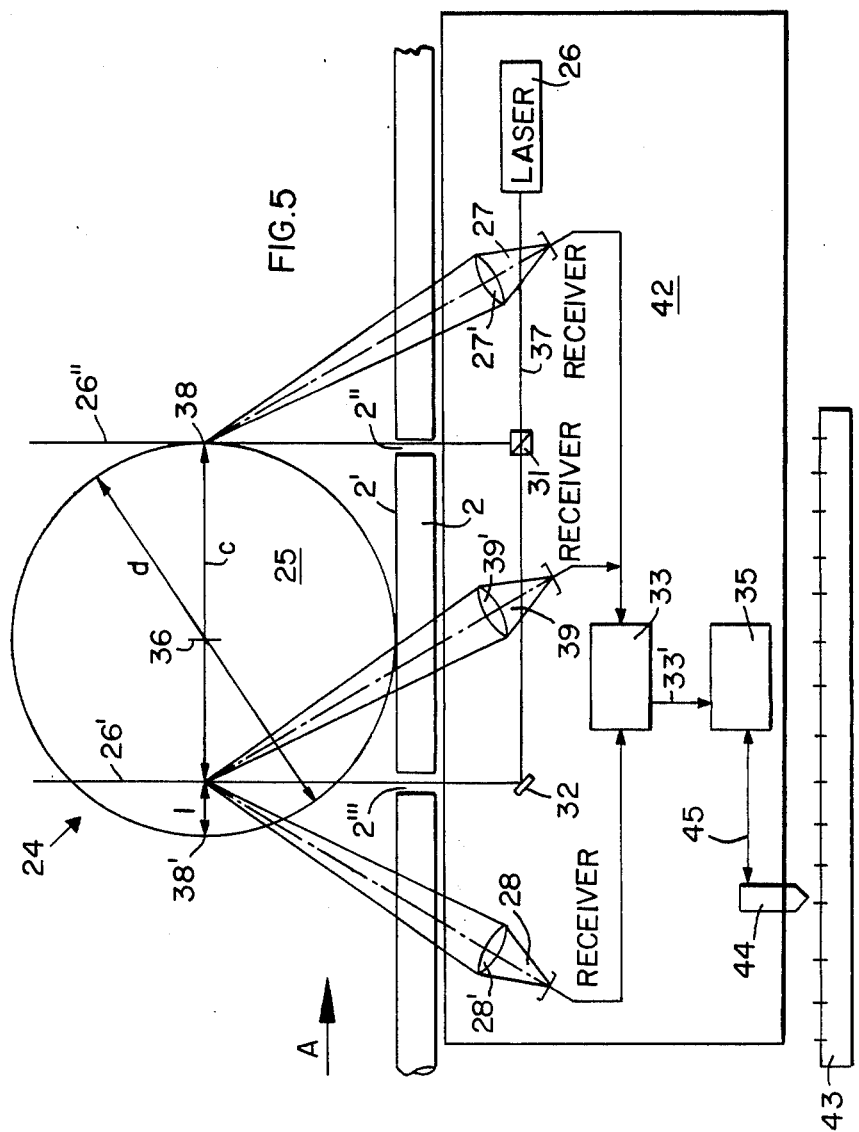
FIG. 5 is a schematic illustration of a measuring station according to the invention.

FIGS. 1 and 5 show a measuring station according to the invention for ascertaining the diameter d of a wheel 25 forming part of a wheel set 24, only one wheel of which is shown in the drawings. The wheel set has an axle 36 and runs on a track 2 having several rail sections forming a rail surface 2'. The wheel 25 rolls in the direction of the arrow A along the surface 2' of the track 2. The horizontal speed of the wheel is not known initially. Lateral rail guides 1 and 1' keep the wheel 25 from lateral excursions.

Incidentally, the measurement can be performed regardless whether the wheel is rolling along the track 2 or whether it is sliding along the track 2, as long as the wheel passes through the measuring station 42 in the direction of the arrow A or vice versa.

The diameter d of the tread surface of the wheel 25 shall be measured in the measuring plane 3 shown in FIG. 1. This measuring plane extends substantially through the center of the wheel and perpendicularly to the rolling axis 36 and may be defined by the so-called "taping line". For this purpose the measuring station 42 shown in FIG. 5 which may be portable or movable, comprises a laser transmitter 26 located below the rail or track section 2 for transmitting a beam or ray bundle 37 in the plane 3 and in parallel to the track 2. The beam 37 passes through a beam splitter 31 for forming a split off beam 26" also extending in the plane 3, but perpendicularly to the track direction. A slot 2" permits the beam 26" to pass through the rail or track section 2.

A beam deflector 32 produces a further beam 26' passing through a slot 2" and extending in parallel to the beam 26". Thus, the beam 26" forms a first light barrier in the measuring plane 3 through which the wheel 25 rolls. The beam splitter and beam deflector 31 are so arranged relative to the beam deflector 32 that an exact, defined distance C is provided between the two parallel beams 26' and 26". This defined distance C may, for example, be smaller than the expected diameter d of the wheel 25.

Assuming that the wheel 25 passes with a constant speed V in the direction of the arrow A past the measuring station 42 of FIG. 5, a spot or zone 38 on the circumferential surface of the wheel 25 will first encounter the beam 26' which also forms a light barrier.

At the moment when the beam 26' becomes a tangent to the wheel 25, at the spot or zone 38, diffuse light from the beam 26' is reflected or retransmitted toward a receiver 39 having the required receiver optical means such as a lens 39' to receive the respective laser light wave lengths. The receiver optical means 39' provides a respective first time marker signal which is transmitted through a conductor to a time measuring device 33. Such a time marker signal may either start a counter, or it may be stored as a time reference point for the precise time when the beam 26' becomes tangent to the spot or zone 38 on the wheel circumference. In that case the time measuring device would comprise a continuously running clock or the like. In other words, the above mentioned time marker defines the beginning of a specific time period.

Referring further to FIG. 5, the wheel 25 continues to roll, for example with a constant speed V, in the direction of the arrow A until the laser beam 26" becomes a tangent to the spot or zone 38. In this instance the distance C is smaller than the wheel diameter d. As a result, diffuse laser light is reflected or retransmitted to be received by the receiver 27 having laser optical means such as a lens 27'. The receiver 27 produces a second output signal representing a second time marker which is also supplied to the time measuring device 33 which provides information regarding the duration or time elapsed between the first and second time markers. An output 33' of the time measuring device 33 is connected to a signal processing unit 35 for calculating, based on said information, the time duration which the wheel 25 needed to pass through the distance C. The signal processing unit 35 calculates the speed V of the wheel 25 and stores this speed in a memory for later use as will be described below.

As the wheel 25 continues to move in the direction of the arrow A with a constant speed, there will be a time duration during which both laser beams 26' and 26" will be interrupted by the circumferential surface of the wheel 25. During this time duration the wheel passes through the distance 1 which depends on the wheel diameter d, provided that the fixed, given or measured distance C is smaller than the wheel diameter d. When the wheel has completed passing through the distance 1, the laser beam 26' becomes tangent to the spot or zone 38' at the rear, so to speak, of the wheel circumferential surface, whereby again light is diffused and reflected or retransmitted and received by the receiver 28 having an optical laser receiver means such as the lens 28'. The receiver 28 provides an output signal as a third time marker to a respective input of the time measuring device 33. Since the speed V of the wheel 25 has been calculated from the time needed by the wheel to pass through the fixed distance C, it is no possible to also calculate the distance 1 which is diameter dependent, by multiplying the known speed V with the time needed for passing through the distance 1. The signal processing unit 35 includes a computing circuit for this purpose. By adding the distance 1 to the distance C the diameter d is determined. This addition is also performed by the computing portion of the signal processing unit 35.

The measuring station 42 comprising the above described components does not need to be stationary, it may be portable or these components may, for example, be mounted on a carriage represented by 42. The carriage would be stopped for aligning the laser beams 26' and 26" with the slots 2' and 2" respectively to take a measurement. Where the laser 26 is stationary, at least the receivers 27, 39 and 28 may be supported on a carriage which is movable alongside the track in the direction of the arrow A or in an opposite direction driven by a motor not shown. In that case, the wheel may be stationary and the movement of the laser optical receiver means 27, 28, and 39 relative to the stationary wheel, provides the same measuring result.

Figure 2:
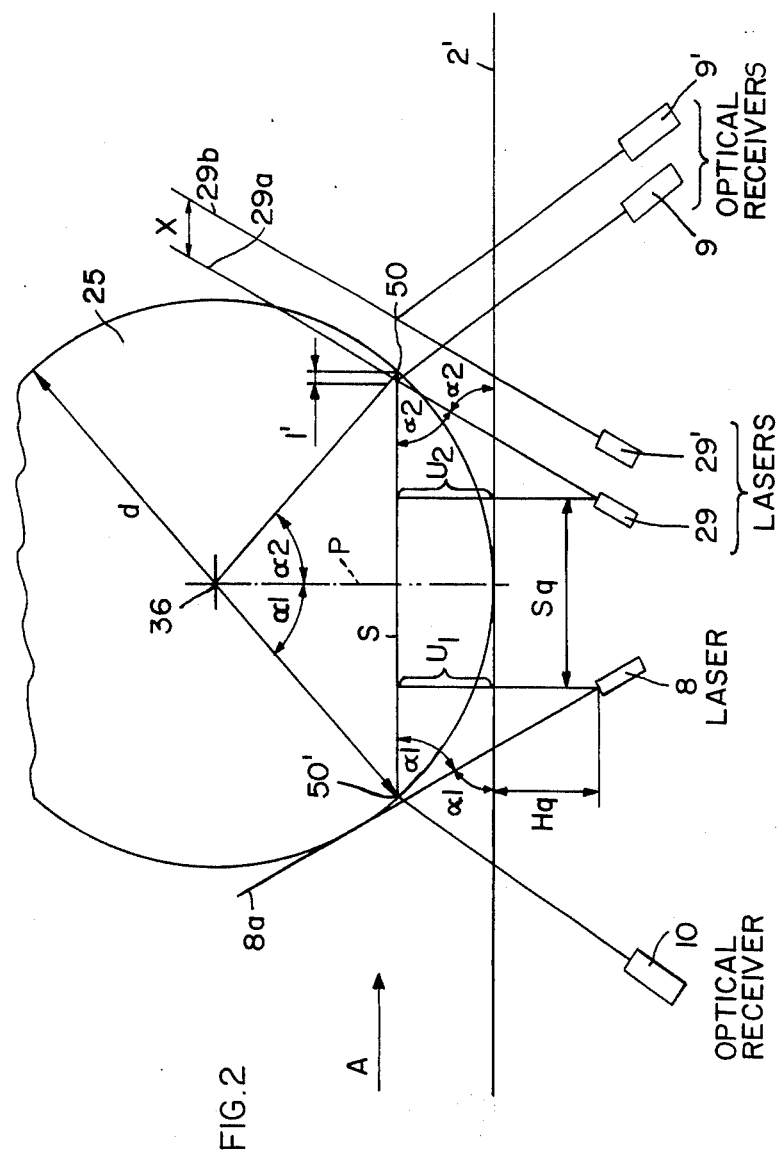
FIG. 2 is a schematic view in the direction of the wheel axis perpendicularly to the measuring plane and the plane in which the wheel is rolling for explaining one type of wheel scanning according to the invention.

It is also possible that the measuring station 42 is arranged for cooperation with a distance measuring device 43, 44. In that case the speed of the measuring station or its carriage does not have to be measured, rather, the distance travelled by the station 42 is ascertained and supplied to the signal processing unit 35, whereby the beginning and end of the relevant distance travelled by the station 42 is determined by the above mentioned first and third time marker. When the optical receiver means are movable back and forth as just explained with reference to FIG. 5, it is sufficient to use but one laser beam 26' which must also be movable along with the measuring station. In that case the laser beam must be able to become a tangent to the zones 38' and 38 of the wheel 25. Such a measuring station as just modified, may first be moved in the direction of the arrow A, whereby the receiver 28 provides a start signal when the laser beam 26' becomes a tangent to the spot or zone 38' to thereby activate the beginning of the distance measurement by the device 43, 44. When now the laser beam 26' becomes a tangent to the zone 38, the receiver 39 produces a second signal which marks the termination of the distance measurement. Thus, the distance travelled by the measuring station 42 including the two receivers 28 and 39 as well as one laser beam transmitter, corresponds to the diameter d and is calculated directly by the signal processing unit 35. If it should be necessary to direct the laser beams at an angle to the horizontal as shown in FIG. 2, rather than at a right angle to the horizontal as shown in FIG. 5, then at least two laser beam generators 8 and 29 are necessary as shown in FIG. 2.

It is desirable to determine the speed V which the wheel 25 has while travelling through the distance 1 as exactly as possible. Therefore, the speed measurement or determination should take place as close as possible to the zone of the distance 1. For this purpose it is practical to direct a third laser beam to the right of the laser beam 26" and in parallel to the laser beam 26". A further beam splitter and deflector such as shown at 31 could be arranged for this purpose in the laser beam 37. A further laser optical receiver such as shown at 39 would then be arranged to sense reflected light coming from the circumference of the wheel 25 where it becomes tangent to the third laser beam. The spacing between the third laser beam, not shown, and the laser beam 26" should then be approximately of the size of the diameter dependent distance 1. This size or order of size is known because the smallest diameter and the largest diameter of the wheels to be measured in the present measuring station are known. In such an arrangement it is possible to determine the speed of the wheel 25 as it travels through the distance 1 so that a higher assurance and accuracy are obtained for calculating the distance 1.

Altogether the sensitivity of the several different receiver optical devices is to be such that the entire spot or zone 38, 38' is properly covered or scanned for the wheel with the smaller diameter and for the wheel with the largest diameter. If this is not possible it is necessary to determine, or rather, narrow the measuring range of the station as a function of the ascertainable zone 38, 38'. In such a modification the respective receiver optical means must be newly adjusted when the initially adjusted scanning range is either exceeded, or not reached. It is also possible to provide several receiver optical devices for scanning respective different zones 38, 38'. In any event, it is necessary that the zone to be scanned by the receiver optical means is free of any opaque obstacles. Thus, gaps as shown at 2' and 2" in FIG. 5 would also be provided in the lateral guide rail 1' in FIG. 1.

FIG. 1 shows a laser generator 4 which is of the same construction as the lasers 8, 12 to 17, 29, and 29'. The laser 4 has a tilting axis 30 about which the laser 4 is tiltable for adjustment. Locking means, not shown, are provided for arresting the laser 4 in an adjusted position. The laser 4 transmits its laser beam in the measuring plane 3. However, the laser 4 must not necessarily be an active laser. A deflector mirror, such as shown at 32 in FIG. 5, could also be used. The illustration in FIG. 1 could be compared to the situation in FIG. 5 when the wheel 25 has moved by the distance 1 in the direction of the arrow A so that the laser beam 26' forms a tangent to the surface of the wheel 25 at the point or zone 38' in the plane 3. As a result, diffuse light 34 is retransmitted or reflected to the receiver optical means 5 which is of the same construction as the receivers 27, 28, 39. The further operation or signal evaluation is the same as has been described above.

The system shown in FIG. 5 is not suitable for measuring the wheel diameter in those instances where the circumferential surface of the wheel is covered for more than 180°, for example, by brake shoes located in the critical areas. In such an instance the beam cannot become a tangent to the zones 38, 38' signifying the diameter of the wheel rather than a chord. However, even under these operating conditions basically the same measuring station and the same measuring operation can be performed for the desired measurement as will now be explained with reference to FIG. 2.

FIG. 2 shows schematically an apparatus for use when only the lower half of a wheel 25 is accessible for the diameter measurement. The lasers 8, 29, and 29' are so oriented that the respective laser beams 8a, 29a, and 29b can become tangent to the circumferential surface of the lower half of the wheel 25. Only one laser 8 is shown, however, several laser beam generators may be used as shown at 29, 29' A central plane P extends perpendicularly to the plane of the drawing, that is, to the measuring plane and axially and long tudinally through the wheel axis 36. The plane P which also extends perpendicularly to the rail 2' divides the lasers into two groups. To the left of the plane P only one laser 8 is shown. To the right of the plane P the two lasers 29, 29' are arranged. However, as mentioned, more than one laser 8 may be used. The laser generators are so arranged that the laser beams in one group diverge relative to the laser beams of the other group as shown. The laser beams of the same group extend in parallel to each other as shown by the laser beams 29a and 29b. The angles $\alpha_1$ and $\alpha_2$ and are so dimensioned that the respective laser beams can indeed become tangent to the wheel circumferential surfaces without any hindrance by other structural components. However, it is not necessary that the angles $\alpha_1$ and $\alpha_2$ are of equal size.

In FIG. 2 the wheel 25 also travels from left to right in the direction of the arrow A, whereby first the laser beam 8a is encountered. However, since the beam 8a does not become a tangent to the leading point or zone 50 on the circumference of the wheel 25, the laser beam receiver 10 does not receive any reflected light at this time. However, when the wheel continues on its travel toward the laser beams 29a, 29b the spot or zone 50 becomes a tangent point of contact between the wheel 25 and the laser beam 29a and a little later the laser beam 29b. Light is now reflected by the zone 50 and first received by the laser optical receiver 9 which provides the first time marker as described above with reference to FIG. 5. As the wheel continues to move through the measuring station, the zone 50' will become a tangent point of contact with the laser beam 8a, at this time diffuse light reflected or retransmitted from the surface of the wheel will be received by the laser optical receiver 10 to provide a second time marker. During this time duration which is ascertained by the signal processing device 35 the wheel has passed through a length 1' which is diameter dependent. However, the speed of the wheel 25 in FIG. 2 has not yet been ascertained.

In the embodiment of FIG. 2 the speed is ascertained with the aid of the further laser optical beam 29b transmitted by the laser 29'. When the laser beam 29b becomes a tangent to the wheel, a third time marker is generated by the diffuse light received by the laser optical receiver 9'. Since the horizontal spacing X between the laser beams 29a and 29b is known, it is possible to calculate the speed of the wheel 25 with the aid of the time difference between the time markers generated by the laser optical receivers 9 and 9'. As a result, it is now also possible to calculate the diameter dependent distance 1' in the manner described above with reference to FIG. 5. The diameter d can now be calculated by taking into account the fixed distances Hq and Sq as well as the angles $\alpha_1$ and $\alpha_2$. In this connection it must be taken into account that $\alpha_1$ will differ from $\alpha_2$ if the vertical distance $U_1$ between the horizontal plane defined by the rail 2' and the spot 50' differs from the vertical distance $U_2$ of the spot 50 from the horizontal plane defined by the rail 2'. If $U_1$ is equal to $U_2$ then $\alpha_1$ will be equal to $\alpha_2$, whereby the calculation to be explained below is substantially simplified. The line S is a parallel to the rail 2' through the spot 50 or through the spot 50'. This line will pass through both spots when $\alpha_1$ is equal to $\alpha_2$.

With the speed of the wheel ascertained as described above, and with the time for passing through the distance 1' measured as described above, and with the fixed dimensions Hq and Sq given along with the angles $\alpha_1$ and $\alpha_2$, the diameter d is calculated by the following equation $$d = $$

-continued $$d = \frac{V \cdot t + Hq\left(\frac{1}{\tan\alpha_1} + \frac{1}{\tan\alpha_2}\right) + Sq}{2 \sin\alpha_1 + \sin\alpha_2 - (1 - \cos\alpha_1) \cdot \frac{1}{\tan\alpha_1} - (1 - \cos\alpha_2) \cdot \frac{1}{\tan\alpha_2}}$$

As mentioned, this equation may be substantially simplified if $\alpha_1$ is equal to $\alpha_2$.

Figure 3:
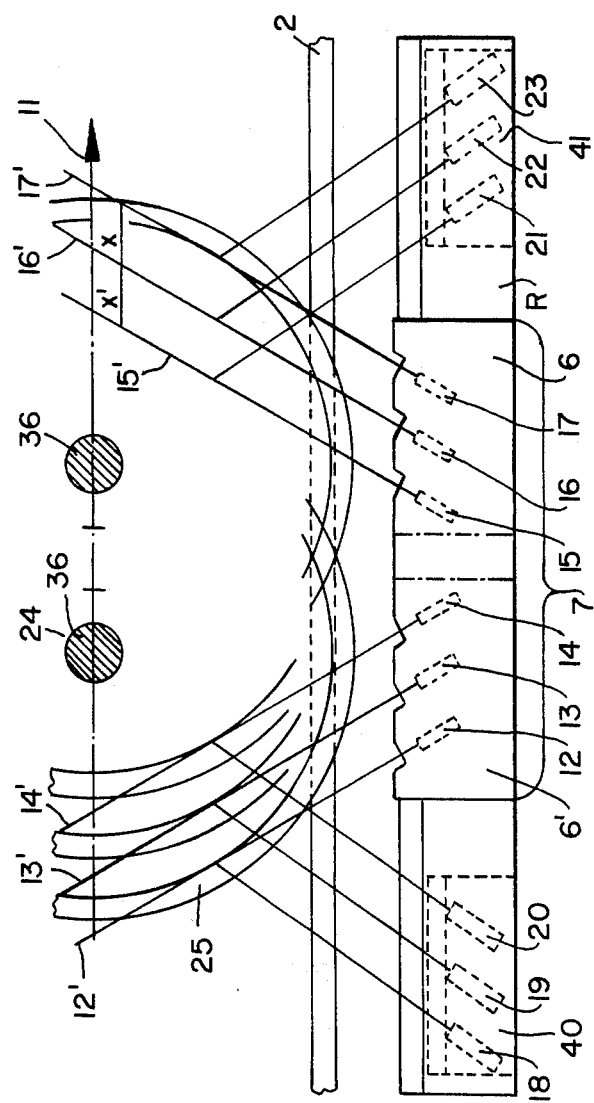
FIG. 3 is a view similar to that of FIG. 2, however, the measuring station of FIG. 3 is used for scanning a moving wheel, thereby also providing for the measuring of the wheel acceleration or deceleration.

FIG. 3 illustrates a measuring station which in principle is similar to that of FIG. 2. However, in FIG. 3 the measuring accuracy is improved by a simple ascertaining of an acceleration component of the wheel 25. For this purpose several laser beam generators 2, 13, and 14 form one set of lasers while laser generators 5, 16, and 17 form a second set of laser generators. The laser beams of each set extend in parallel to each other. Additionally, the laser beams of one set diverge relative to the laser beams of the other set. The set 6' of laser generators 12, 13, and 14 cooperate with a set 40 of laser optical receivers 18, 19 and 20. The set 6 of laser beam generators 15, 16, and 17 cooperates with laser optical receivers 21, 22, and 23 forming a set 41. All laser generators in the sets 6 and 6' may be included in one housing 7 that may be exchangeable as a unit. Similarly, the optical receiver sets 40 and 41 are exchangeable as units. All units are carried by a frame member R, extending in parallel to the rail 2, whereby the housing 7 of the laser beam generators is secured to one side of the frame member R and the laser optical receiver sets 40 and 41 are secured to the opposite of the frame member R. The lasers 12 to 17 may be tiltable individually about a adjustment axis for adjusting the direction of the laser beams individually as has been mentioned above with regard to FIG. 1 where the adjustment is about the axis 30. The laser optical receivers 18 to 23 may also be individually adjustable about respective axes, unless several receivers are used for receiving diffuse light from differently adjusted positions of the same laser beam.

In FIG. 3 the wheel set 24 with its axle 36 carrying wheels 25 travels from left to right in the direction of the arrow 11. As the wheel 25 first passes through the beams 12', 13', and 14' the respective receivers 18, 19, and 20 do not receive any diffuse light. However, as the wheel continues to travel to the right, it will sequentially become tangent to the laser beams 15', 16' and 17'. Each of these laser beams 15', 16', and 17' will thus be diffused to cause a signal to be received in the receivers 21, 22, and 23 respectively, thereby producing respective time marker signals.

The horizontal distance x' between the parallel laser beams 15' and 16' is known. The horizontal distance x between the parallel laser beams 16' and 17' is also known. Therefore, with the time durations measured with the aid of the just mentioned time markers, it is possible to determine the speed of the wheel travelling through these distances x' and x. If there is a difference between these speeds the acceleration or deceleration may also be calculated.

Shortly after the wheel 25 has passed through the laser beam 15', the respective spot on its circumferential surface on the back side of the wheel becomes tangent to the beam 12' in the measuring plane 3. Accordingly, the receiver 18 receives the respective diffused laser light and provides a time marker. The time difference between the time marker set by the receiver 21 and the time marker set by the receiver 18 permits calculating the diameter dependent distance 1' based on the known or ascertained speed of the wheel or of the acceleration of the wheel as described above with reference to FIG. 2. This operation is repeated with reference to the beams 13' and 14' which cause the receivers 19 and 20 to set respective time markers for ascertaining the speed and the acceleration of the wheel 25. Besides, the horizontal spacings between the laser beams 12 and 13, and 13 and 14 are known so that the speed and acceleration may be checked. Due to this double checking, so to speak, it is possible to also avoid erroneous measurements which could result, for example, from flat areas on the circumferential surface of a worn out or partially worn wheel.

Figure 4:
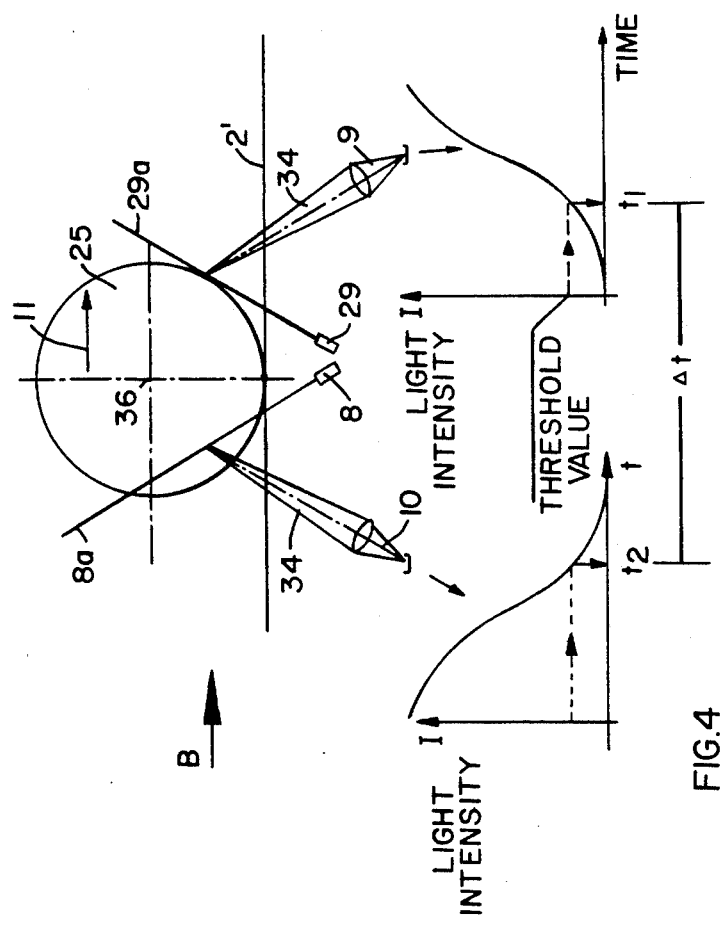
FIG. 4 is a view perpendicularly to the measuring plane defined by the sheet of drawing, for explaining the time measuring according to the invention.

A time measurement may be performed with the measuring station shown in FIG. 4. The lasers 8 and 29 are so located and adjusted in their position that the laser beams 8a and 29a diverge. Each of the laser optical receiver means 9 and 10 receives at its proper time a diffuse, reflected laser light 34. Each receiver 9 and 10 is so adjusted in its sensitivity that a certain threshold value of the reflected diffuse light must be exceeded for setting a time marker. As in FIG. 2, the receiver 9 sets a first time marker t1 and the receiver 10 sets a time marker t2. The time difference $\Delta t$ between t1 and t2 represents the time needed by the wheel to pass through the diameter dependent distance 1'.

Generally, the laser beam generators should be equipped with such laser optical means that the respective laser beam, for example 8a or 29a, is focused onto the wheel circumferential surface, whereby the measuring accuracy and the repeatability of the measurements is improved.

In order to minimize interfering influences at the receivers, especially at the receiver optical means, the laser beam generators should be emitting, either at a high pulse frequency or the laser beams should be modulated, whereby the modulating frequency will depend on the travelling speed of the respective wheel.

It is also desirable and useful to monitor the light output of each laser beam generator to assure uniform measuring results. The degree of contamination on the surface of the optical means should also be monitored for the same purpose, for example, by measuring the diffusion degree of the remitted or retransmitted or reflected laser light.

Since measuring stations of this type must operate under rather rough operating conditions, for example in a railroad repair yard, it is desirable to house the transmitter unit or units in a dust and water tight casing. The output window or windows in such a casing should be provided with protective caps or flaps that can be opened or closed as needed. Additionally, or instead, a continuous airstream could be used to prevent contamination of such light output windows.

The receiver optical means for receiving the reflected or remitted or retransmitted light can be arranged in the space to the right of the measuring plane 3 as shown in FIG. 1, preferably in a position where there is the least likelihood of damage and where there is a maximum reception of the diffused laser light. Each receiver should be provided with a protective window which is protected by an air curtain against moisture and condensation. Even automatic window wipers and/or heating systems could be used for protecting the input windows of the receivers. The optical receivers comprise photosensitive detectors which convert the incoming light into an electric signal which has been described above with reference to FIG. 5. A suitable light filter may be used for improving the signal definition.

In view of the foregoing, it will be appreciated that the time measurement and any acceleration measurement, can be performed on the run-in side and/or on the run-out side of the measuring station. In FIG. 4, for example, the run-in side is defined by the laser beam 29a and the run-out side is defined by the laser beam 8a. By providing the laser generators and the laser receivers in groups as mentioned above, for example with reference to FIG. 3 it is possible to modify the measuring capacity of a measuring station by a change in the sets of transmitters and receivers. For example, one set of laser beam generators could be exchanged against another set of laser beam generators with differently adjusted beam directions. Sets of transmitters and receivers may form groups.

By making the beam direction adjustable, it is possible to make the laser beams parallel to each other and to select the proper diverging angle between the laser beams of two groups, please see FIGS. 2 and 3. This feature further permits adapting a particular measuring station to the available space next to a railroad track, for example. By using beam splitters and/or deflectors as shown in FIG. 5, a single laser beam generator 26 can be used for several purposes. This is especially possible when the two laser beams extend not only in parallel to each other, but also perpendicularly to the plane of the rail.

By focusing each transmitted laser beam onto the spot or zone where tangential contact is expected, the beam will have its narrowest diameter at the spot where it is needed, whereby the measuring precision and measuring repeatability is greatly improved.

By arranging the laser beam generators and the receivers on a movable carriage as shown at 42 in FIG. 5, such carriage can cooperate with a distance measuring device, whereby the diameter may be determined without any separate determination of the distance-time function. As a result, the diameter can be ascertained by a simple distance measurement. This is an important advantage of the invention.

Although the invention has been described with reference to specific example embodiment, it will be appreciated, that it is intended to cover all modications and equivalents within the scope of the appended claims.

A semiconductor laser with collimating optics of the type 513 CQL-A manufactured by Phillips (Valvo) may be used for the present purposes. A suitable receiver may be a silicon detector of the type SD 444.42.22.261 manufactured by Silicon Detector Corporation, 855 Lawerence Dr., Newbury Park, Calif., 91320.

What we claim is:

1. A method for calculating the diameter (d) of a wheel, comprising the following steps:
   (a) providing a relative movement between a measuring station and said wheel relative to a defined reference plane,
   (b) establishing a distance-time function based on said relative movement,
   (c) defining a diameter dependent distance or length parallel to said reference plane in a measuring plane passing through said wheel perpendicularly to said reference plane,
   (d) measuring the time needed by said relative movement for passing through said defined diameter dependent distance or length to provide a measured length of time, and (e) calculating the diameter (d) of said wheel on the basis of said diameter dependent distance or length and on the basis of said measured length of time in accordance with said distance-time function.

2. The method of claim 1, wherein said distance-time function involves a speed, wherein said speed is measured repeatedly, and wherein said speed measurements are used for calculating an acceleration.

3. The method of claim 1, wherein said time measuring step is performe repeatedly while said (distance-/time function) is known.

4. The method of claim 1, wherein said relative movement is provided by rolling a wheel or wheel set through said measuring station, wherein said speed is determined as a wheel rolling speed, measuring said time needed by the wheel for passing through said distance in said measuring plane, and then performing said calculation of said wheel diameter.

5. An apparatus for measuring the diameter of a wheel having a rotational axis and axially facing wheel sides, comprising wheel support means (2) defining a reference plane (2'), said wheel having a measuring plane (3) extending through said wheel between said axially facing wheel sides perpendicularly to said rotational axis and perpendicularly to said reference plane, a measuring station comprising transmitter means including at least two members for transmitting at least two beams of electromagnetic radiation onto a wheel circumferential surface passing through said measuring plane of said wheel, means mounting said at least two transmitter members in fixed positions for spacing said two beams at a defined distance (C) from each other, receiver means arranged for receiving light returned or retransmitted by said wheel circumferential surface to produce time marker signals, time measuring means connected to said receiver means for measuring in response to said time marker signals a time duration needed for traversing said defined distance, and signal processing means including computer means for calculating said diameter on the basis of said defined distance and on the basis of said time duration determined by said time marker signals.

6. The apparatus of claim 5, wherein said transmitter means comprise tuning means for tuning said transmitter means to a frequency within the range of 200 to 2000 nm (nanometers).

7. The apparatus of claim 5, further comprising carriage means for moving said measuring station, said transmitter means and said receiver means being mounted on said carriage means for moving said transmitter means and said receiver means past a stationary wheel.

8. The apparatus of claim 5, wherein said wheel support means (2) comprise a rail section forming said reference plane (2'), and wherein said transmitter means comprise at least two laser beam generators, said receiver means comprising at least two returned laser light receiver means for receiving laser light reflected by said wheel circumferential surface.

9. The apparatus of claim 8, wherein said transmitter means comprise a plurality of laser beam transmitters arranged in groups in such a way that the respective laser beams from laser beam transmitters of the same group have a given, fixed spacing from each other in a direction parallel to said reference plane, said receiver means also having a plurality of respectively spaced receivers.

10. The apparatus of claim 9, wherein said laser beams extend in parallel to each other.

11. The apparatus of claim 9, wherein said fixed spacing (X) between neighboring laser beams is smaller than said defined distance (C).

12. The apparatus of claim 5, wherein said transmitter means comprise at least two sets of laser beam generators, wherein said receiver means comprise at least two sets of respective laser optical receiver means, said sets having a fixed known gap (Sq) therebetween, wherein laser beams in the same set have a fixed spacing (X) between neighboring laser beams, said sets also having a determined known separation (Hq) from said reference plane, wherein said laser beam generators and the respective laser optical receiver means are so arranged that laser beams coming from one set of laser beam generators diverge relative to a laser beam or beams coming from the other set of laser beam generators, whereby a dividing plane (P) extending axially in said wheel axis (36) and perpendicularly to said reference plane (2') divides one set from the other set.

13. The apparatus of claim 12, wherein said dividing plane (P) is an angle bisector for a diverging angle between laser beams of one set and laser beams of the other set.

14. The apparatus of claim 12, wherein laser beams of one set of laser beam generators extend in parallel to each other.

15. The apparatus of claim 12, wherein said measuring station has a run-in side and a run-out side as viewed in the direction of relative movement, wherein said laser beam generators comprise at least one run-in laser beam generator (8), wherein said laser optical receiver means comprise at least one run-in laser optical receiver (10), said run-in laser beam generator and said run-in laser optical receiver forming a run-in group at said run-in side of said measuring station for producing a time marker signal, said laser beam generators further comprising a plurality of run-out laser beam generators and a respective plurality of run-out laser optical receiver means forming a run-out group of laser beam generators and laser optical receivers for providing further time marker signals.

16. The apparatus of claim 5, wherein said transmitter means comprise a tilting axis for adjusting the direction of a respective beam.

17. The apparatus of claim 5, wherein said transmitter means comprise a single beam transmitter, said at least two members including a beam splitter and beam deflector for providing said at least two beams from said single beam transmitter.

18. The apparatus of claim 5, wherein said transmitter means comprise means for focussing the respective beam onto a zone of said wheel circumferential surface which is expected to become tangent to the respective beam.

19. The apparatus of claim 5, wherein said measuring station comprises movable carriage means for movably carrying said transmitter means and said receiver means, distance measuring means (43, 44) arranged for cooperation with said carriage means for measuring a defined displacement of said carriage means to provide a respective displacement or distance travelled representing signal, and means (45) connecting said distance measuring means (44) to said signal processing means for using the distance measured in calculating a wheel diameter.

* * * * *